(12) United States Patent
Bourdoncle et al.

(10) Patent No.: US 7,207,674 B2
(45) Date of Patent: Apr. 24, 2007

(54) OPHTHALMIC LENS

(75) Inventors: Bernard Bourdoncle, Paris (FR); Cyril Guilloux, Charenton-le-Pont (FR); Hervé Josso, Charenton-le-Pont (FR)

(73) Assignee: Esslior International (Compagnie General d'Optique) (FR)

( * ) Notice: Subject to any disclaimer, the term of this patent is extended or adjusted under 35 U.S.C. 154(b) by 0 days.

(21) Appl. No.: 11/392,235

(22) Filed: Mar. 29, 2006

(65) Prior Publication Data

US 2006/0262270 A1    Nov. 23, 2006

(30) Foreign Application Priority Data

Apr. 8, 2005 (FR) .................................. 05 03543

(51) Int. Cl.
*G02C 7/06* (2006.01)
(52) U.S. Cl. ........................................ 351/169; 351/177
(58) Field of Classification Search ................ 351/169, 351/177
See application file for complete search history.

(56) References Cited

U.S. PATENT DOCUMENTS

| 4,854,689 | A | | 8/1989 | Dufour et al. |
| 5,270,745 | A | | 12/1993 | Pedrono |
| 5,272,495 | A | | 12/1993 | Pedrono |
| 5,488,442 | A | | 1/1996 | Harsigny et al. |
| 5,708,493 | A | * | 1/1998 | Ahsbahs et al. ............ 351/169 |
| 5,812,238 | A | | 9/1998 | Ahsbahs et al. |
| 5,949,519 | A | | 9/1999 | Le Saux et al. |
| 6,102,544 | A | | 8/2000 | Baudart et al. |
| 6,116,734 | A | | 9/2000 | Pedrono et al. |
| 6,186,626 | B1 | * | 2/2001 | Francois et al. ............ 351/169 |
| 6,260,967 | B1 | | 7/2001 | Edwards et al. |

(Continued)

FOREIGN PATENT DOCUMENTS

EP      0 990 939      4/2000

(Continued)

OTHER PUBLICATIONS

W.N. Charman et al., "Astigmatism, accommodation, and visual instrumentation", *Applied Optics*, vol. 17, No. 24, pp. 3903-3910 (Dec. 15, 1978).

(Continued)

*Primary Examiner*—Scott J. Sugarman
(74) *Attorney, Agent, or Firm*—Fish & Richardson P.C.

(57) ABSTRACT

An ophthalmic lens has a complex surface with an optical centre, a fitting cross (FC) situated 4 mm above the optical centre, a meridian having a power addition between reference points in far vision (FV) and in near vision (NV). The complex surface has a mean-sphere difference normalized to the addition on the meridian, between the geometric centre of the lens and the control point in far vision, less than or equal to 0.1; a progression length less than or equal to 14 mm; a rebound of the sphere quantity normalized to the addition on a circle with a radius of 20 mm centred on the geometric centre of the lens less than 0.11, and a maximum slope of the sphere variation normalized to the addition along the meridian comprised between 0.9 and 0.11 mm$^{-1}$. The lens is suited to broadened far vision with a good accessibility to near vision.

9 Claims, 7 Drawing Sheets

U.S. PATENT DOCUMENTS

| | | |
|---|---|---|
| 6,318,859 B1 | 11/2001 | Baudart et al. |
| 6,382,789 B1 | 5/2002 | Baudart et al. |
| 6,540,354 B2 | 4/2003 | Chauveau et al. |
| 6,595,637 B2 | 7/2003 | Ahsbahs et al. |
| 6,595,638 B2 | 7/2003 | Ahsbahs et al. |
| 6,652,096 B1 | 11/2003 | Morris et al. |
| 6,682,194 B2 | 1/2004 | Ahsbahs et al. |
| 6,793,340 B1 | 9/2004 | Morris et al. |
| 2002/0171803 A1 | 11/2002 | Ahsbahs et al. |
| 2002/0176048 A1 | 11/2002 | Ahsbahs et al. |
| 2002/0180928 A1 | 12/2002 | Ahsbahs et al. |
| 2003/0156251 A1 | 8/2003 | Welk et al. |

FOREIGN PATENT DOCUMENTS

| | | |
|---|---|---|
| FR | 2 588 973 | 4/1987 |
| FR | 2 683 642 | 5/1993 |
| FR | 2 699 294 | 6/1994 |
| FR | 2 704 327 | 10/1994 |
| FR | 2 753 805 | 3/1998 |
| FR | 2 769 997 | 4/1999 |
| FR | 2 769 998 | 4/1999 |
| FR | 2 769 999 | 4/1999 |
| FR | 2 770 000 | 4/1999 |
| FR | 2 809 193 | 11/2001 |
| FR | 2 820 515 | 8/2002 |
| FR | 2 820 516 | 8/2002 |
| GB | 2 277 997 | 11/1994 |
| WO | WO 98/12590 | 3/1998 |
| WO | WO 03/048841 | 6/2003 |

OTHER PUBLICATIONS

Rainer G. Dorsch et al., "Coma and Design Characteristics of Progressive Addition Lenses", *Vision Science and Its Applications*, Technical Digest Series vol. 1, Santa Fe, New Mexico pp. SaA3-1/68-SaA3-4/71(Feb. 6-9, 1998).

Eloy A. Villegas et al., "Spatially Resolved Wavefront Aberrations of Ophthalmic Progressive-Power Lenses in Normal Viewing Conditions", *Optometry and Vision Science*, vol. 80, No. 2, pp. 106-114 (Feb. 2003).

* cited by examiner

OPHTHALMIC LENS

CROSS REFERENCE TO RELATED APPLICATION

Pursuant to 35 U.S.C. § 119, this application claims the benefit of prior French Patent Application 05 03 543, filed Apr. 8, 2005. The contents of the prior application is incorporated herein by reference in its entirety.

TECHNICAL FIELD

This invention relates to an ophthalmic lens.

BACKGROUND

Any ophthalmic lens intended to be held in a frame involves a prescription. The ophthalmic prescription can include a positive or negative power prescription as well as an astigmatism prescription. These prescriptions correspond to corrections enabling the wearer of the lenses to correct defects of his vision. A lens is fitted in the frame in accordance with the prescription and with the position of the wearer's eyes relative to the frame.

In the simplest cases, the prescription is nothing more than a power prescription. The lens is said to be unifocal and has a rotational symmetry. It is fitted in a simple manner in the frame so that the principal viewing direction of the wearer coincides with the axis of symmetry of the lens.

For presbyope wearers, the value of the power correction is different for far vision and near vision, due to the difficulties of accommodation in near vision. The prescription thus comprises a far-vision power value and an addition (or power progression) representing the power increment between far vision and near vision; this comes down to a far-vision power prescription and a near-vision power prescription. Lenses suitable for presbyope wearers are progressive multifocal lenses; these lenses are described for example in FR-A-2 699 294, U.S. Pat. No. 5,270,745 or U.S. Pat. No. 5,272,495, FR-A-2 683 642, FR-A-2 699 294 or also FR-A-2 704 327. Progressive multifocal ophthalmic lenses include a far-vision zone, a near-vision zone, an intermediate-vision zone, a principal progression meridian crossing these three zones. They are generally determined by optimization, based on a certain number of constraints imposed on the different characteristics of the lens. These lenses are all-purpose lenses in that they are adapted to the different needs of the wearer at the time.

For young presbyopes, lenses have been proposed which do not have a far-vision zone with a reference point, unlike standard progressive multifocal lenses; these lenses are described in FR-A-2 588 973. These lenses are prescribed only in accordance with the power required by the wearer in near vision, regardless of the power required by the wearer in far vision. The lens has a central part which has an additional spherical power offering the wearer satisfactory near vision. It also has a slight decrease in power in the upper part, which gives the wearer clear vision even beyond the normal near-vision field. Finally, the lens has a point with a power value equal to the nominal near-vision power, a higher-power zone in the lower part of the lens and a lower-power zone in the upper part of the lens.

FR-A-2 769 997 proposes a lens which, compared with a standard progressive multifocal lens, has a stabilized and larger near-vision zone, a significant increase in the field widths in near vision and intermediate vision, as well as a reduction in the aberrations and in particular of astigmatism. It provides a suitable correction for distances between 40 and 80 cm and, in most cases, for distances between 40 cm and 2 m. This lens is actually a near-vision-intermediate-vision mid-distance lens, favouring near vision while providing clear vision beyond the normal near-vision field. On the other hand, no far vision is available. This lens proves particularly well suited to computer work. It is prescribed for young presbyopes, solely in accordance with the prescription for near vision. The rear face of the lens is machined in order to provide a near-vision power matching the prescription, without taking account of the far vision prescription. Two front faces are sufficient to meet all of the wearer's needs.

FR-A-2 769 999 proposes a progressive multifocal ophthalmic lens having improved smoothness with a monotone sphere variation in relation to the angle on a circle with a radius of 20 mm centred on the geometric centre of the lens on either side of the meridian. This lens provides cleared far vision covering an angular sector originating in the geometric centre of the lens and an angle at the centre greater than 150°.

Multifocal lenses, whether they are progressive or intended purely for near vision, can include a complex multifocal face (i.e. assuming no axis of revolution, typically a surface having a power progression), for example the face facing the person wearing the glasses, and a spherical or toric face, called prescription face. This spherical or toric face allows the lens to be adapted to the user's ametropia, so that a multifocal lens is generally defined only by its complex surface. For a given product different complex faces are defined in accordance with the addition and the base (or mean far-vision sphere). Starting from semi-finished lenses, of which only the multifocal face is formed, it is possible to prepare lenses suited to each wearer, by simple machining of a spherical or toric prescription face.

Independently of the power prescription, a wearer may be given an astigmatism prescription. Such a prescription is produced by the ophthalmologist in far vision in the form of a pair formed by an axis value (in degrees) and an amplitude value (in diopters). On a surface, the amplitude value represents the difference $1/R_1 - 1/R_2$ between the principal curvatures; the axis value represents the orientation, relative to a reference axis and in a conventional direction of rotation, of the maximum curvature $1/R_1$. In prescription terms, the amplitude value represents the difference between the minimum and maximum powers in a given direction and the axis represents the orientation of the maximum power. The term astigmatism is used for the pair (amplitude, angle); this term is also sometimes used, although this is linguistically incorrect, for the amplitude of the astigmatism. The context allows a person skilled in the art to understand which meaning is intended.

SUMMARY

The invention proposes a lens which is easier to adapt compared to standard ophthalmic lenses and which can be fitted in a frame using a simplified method; it allows the wearer to be offered the advantages of a unifocal lens in far vision, and also with good accessibility to the powers required in near vision and excellent perception in dynamic vision while limiting the power variations. The invention also proposes a lens having an improved tolerance to fitting or measuring errors.

The invention thus proposes an ophthalmic lens having a complex surface with an optical centre, a fitting cross situated 4 mm above the optical centre on the vertical axis of the lens, a markedly umbilicated meridian having a power addition between a reference point in far vision and a reference point in near vision, the complex surface having:

a mean-sphere difference normalized to the addition on the meridian, between the geometric centre of the lens and the control point in far vision, less than or equal to 0.1;

a progression length less than or equal to 14 mm, the progression length being defined as the vertical distance between the fitting cross and the point on the meridian at which the mean sphere reaches 85% of the progression of the addition;

a rebound in the sphere quantity normalized to the addition (sphere/addition) on a circle with a radius of 20 mm centred on the geometric centre of the lens of less than 0.11;

a maximum slope of the sphere variation normalized to the addition along the meridian comprised between 0.09 and 0.11 mm$^{-1}$.

According to one embodiment, the mean-sphere difference normalized to the addition on the meridian, between the geometric centre of the lens and the control point in far vision, is less than or equal to 0.06.

According to one embodiment, the rebound in the sphere quantity normalized to the addition on the circle with a radius of 20 mm centred on the geometric centre of the lens is less than 0.085.

According to one embodiment, the complex surface has, for the part of the lens situated above a horizontal line passing through the fitting cross, a cylinder value less than or equal to half of the power addition.

According to one embodiment, the complex surface has a more or less constant mean-sphere value around the fitting cross.

According to one embodiment, the complex surface has a 0 diopter isosphere line encircling the fitting cross.

The invention also relates to a visual device including at least a lens according to the invention and a method for correcting the vision of a presbyope subject, which comprises providing the subject with, or the wearing by the subject of, such a device.

The invention also relates to a method for fitting a lens according to the invention in a visual device, comprising:

measurement of the horizontal position of the pupil of the wearer in far vision;

determination of the overall height of the size of the frame of the visual device;

fitting of a lens in the device, with the fitting cross at the measured position.

Other advantages and characteristics of the invention will become apparent on reading the following description of the embodiments of the invention, given by way of example and with reference to the drawings:

DETAILED DESCRIPTION

In the rest of the description, for the sake of simplicity of the disclosure, the case of a lens having one complex surface and one spherical or toric surface is considered. The complex face of the lens can be the front face (remote from the wearer), as is the case for progressive multifocal lenses of the state of the art. Lenses with a radius of 30 mm are considered.

In a manner known per se, at any point of a complex surface, a mean sphere D given by the formula:

$$D = \frac{n-1}{2}\left(\frac{1}{R_1} + \frac{1}{R_2}\right)$$

is defined, where $R_1$ and $R_2$ are the maximum and minimum local curvature radii expressed in metres, and n is the index of the material constituting the lens.

A cylinder C, given by the formula:

$$C = (n-1)\left|\frac{1}{R_1} - \frac{1}{R_2}\right|,$$

is thus defined.

The characteristics of the complex face of the lens can be expressed using the mean sphere and the cylinder.

The invention proposes a progressive multifocal ophthalmic lens having the advantages of a broadened far vision allowing an excellent perception in dynamic vision, and also a good accessibility in near vision. The lens makes it possible to improve accessibility to the powers required for a clear far vision with a cleared field, by extending the far-vision zone below the fitting cross. The proposed solution also provides a good accessibility to the powers required in near vision, allowing the wearer to see satisfactorily at distances equal to approximately 40 cm without obliging him to lower his eyes very much, the near-vision zone being accessible from 14 mm below the fitting cross. The lens is thus a lens suitable for a broadened far vision and near vision. The lens has a prescription such that the powers prescribed for the wearer in far vision and in near vision are achieved on the lens.

Figure 1:
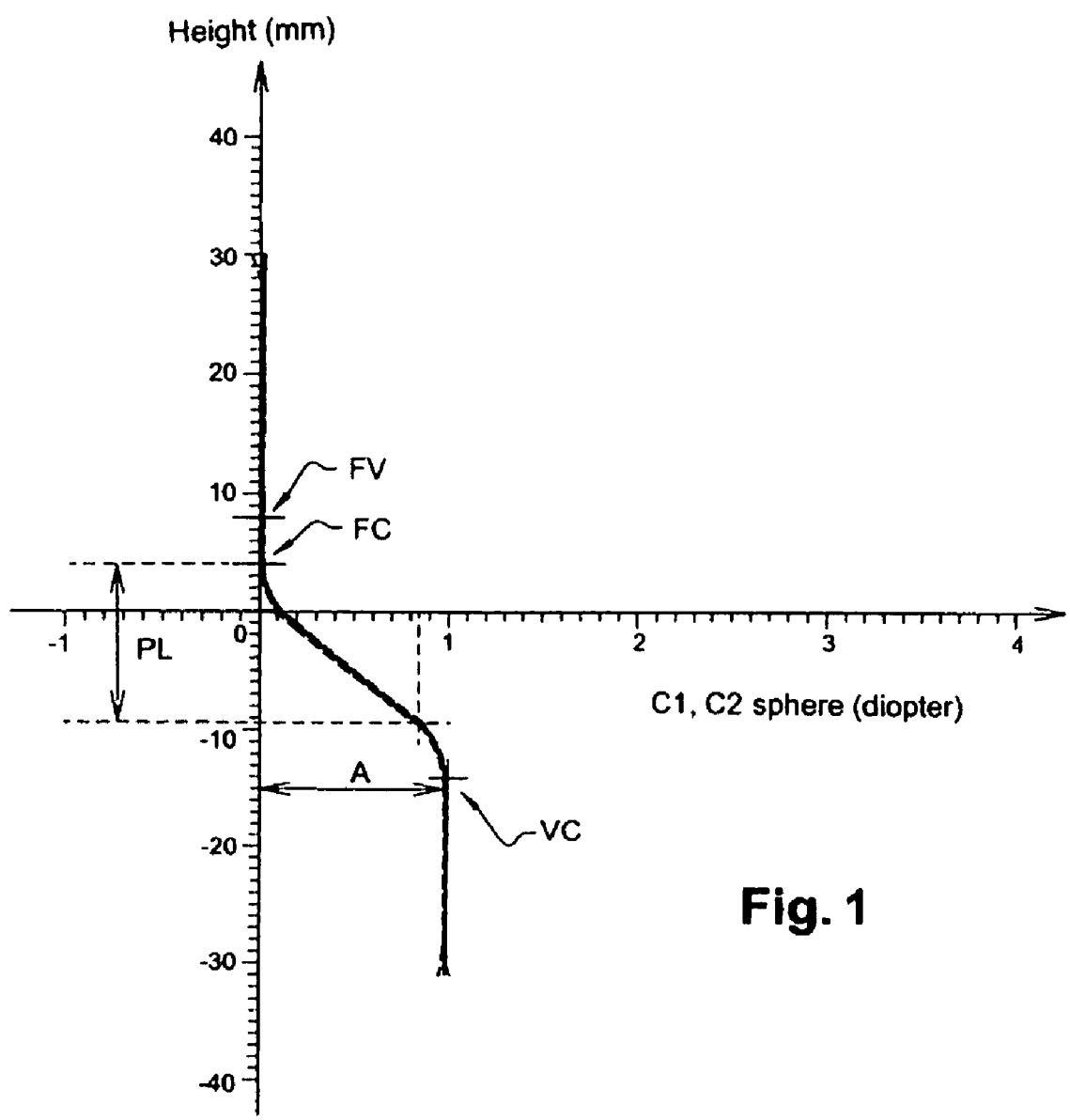
FIG. 1, a diagram of the principle curvatures and of the sphere on the axis of a lens according to a first embodiment of the invention.
Figure 2:
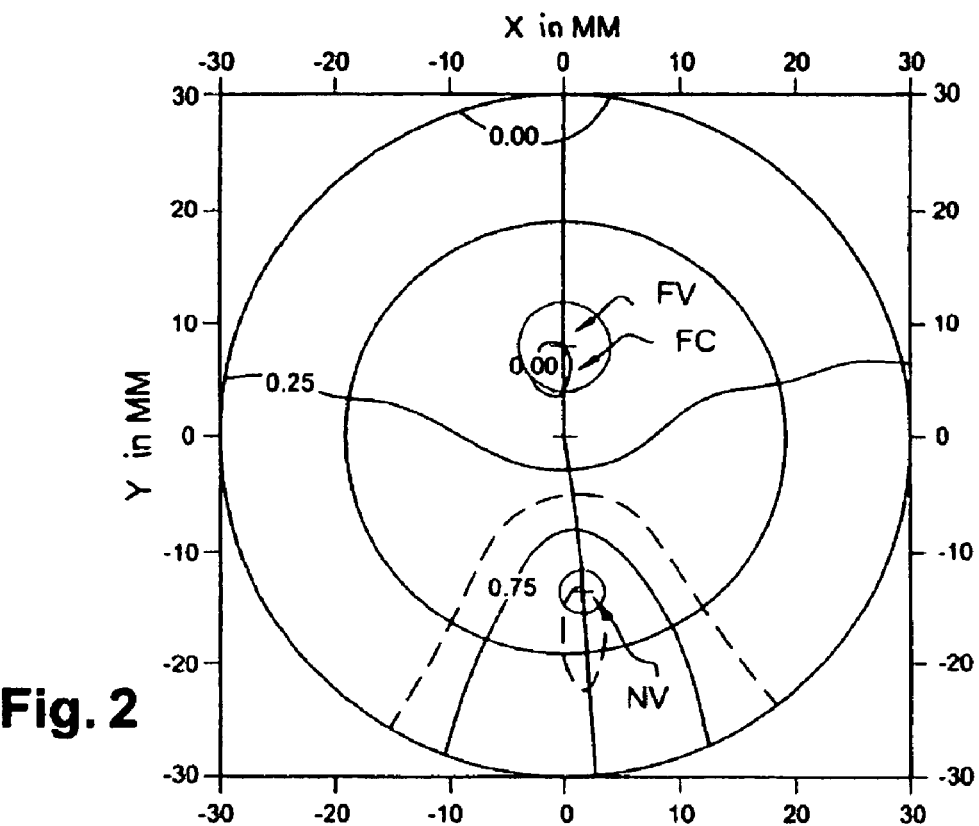
FIG. 2, a mean-sphere map of the lens of FIG. 1.
Figure 3:
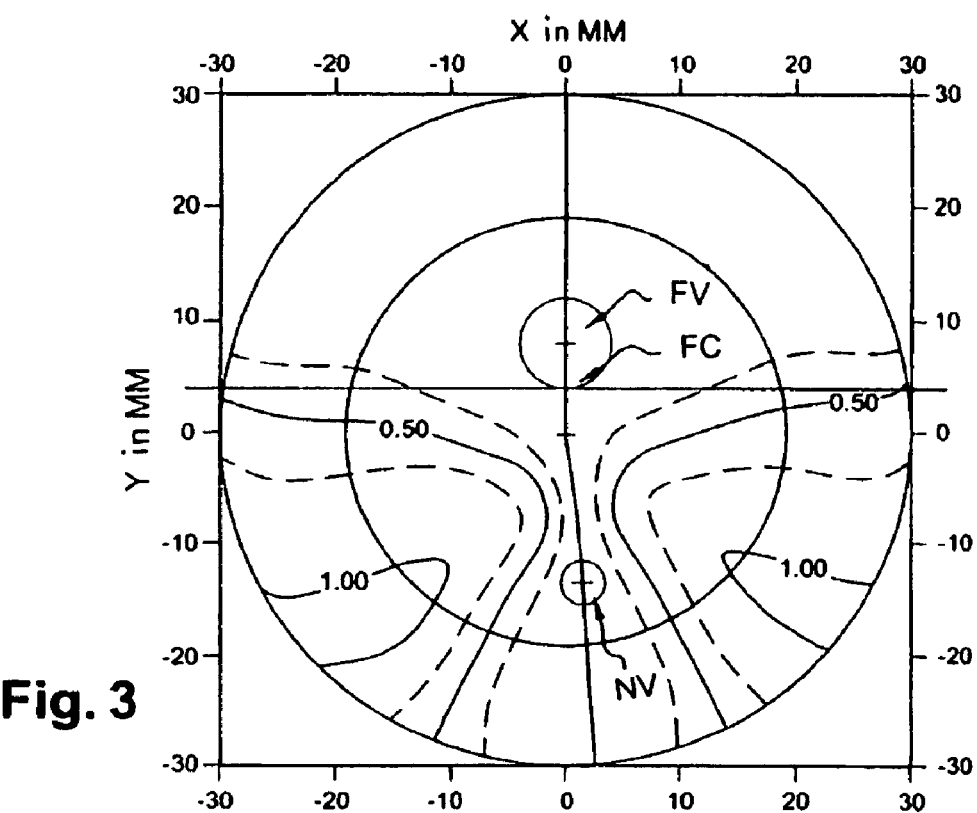
FIG. 3, a cylinder map of the lens of FIG. 1.
Figure 4:
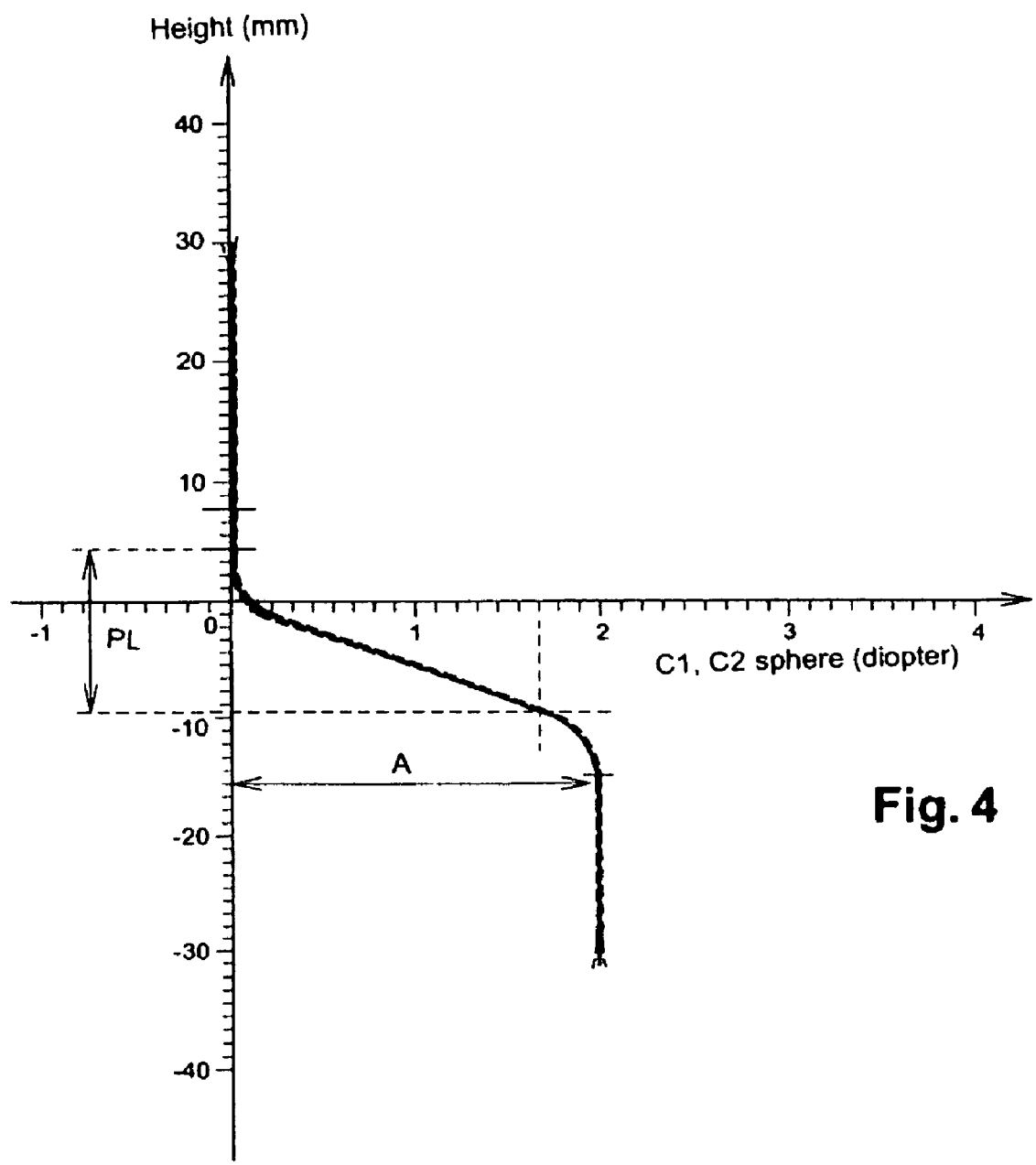
FIGS. 4 to 6, figures similar to FIGS. 1 to 3, for a lens according to a second embodiment of the invention.
Figure 5:
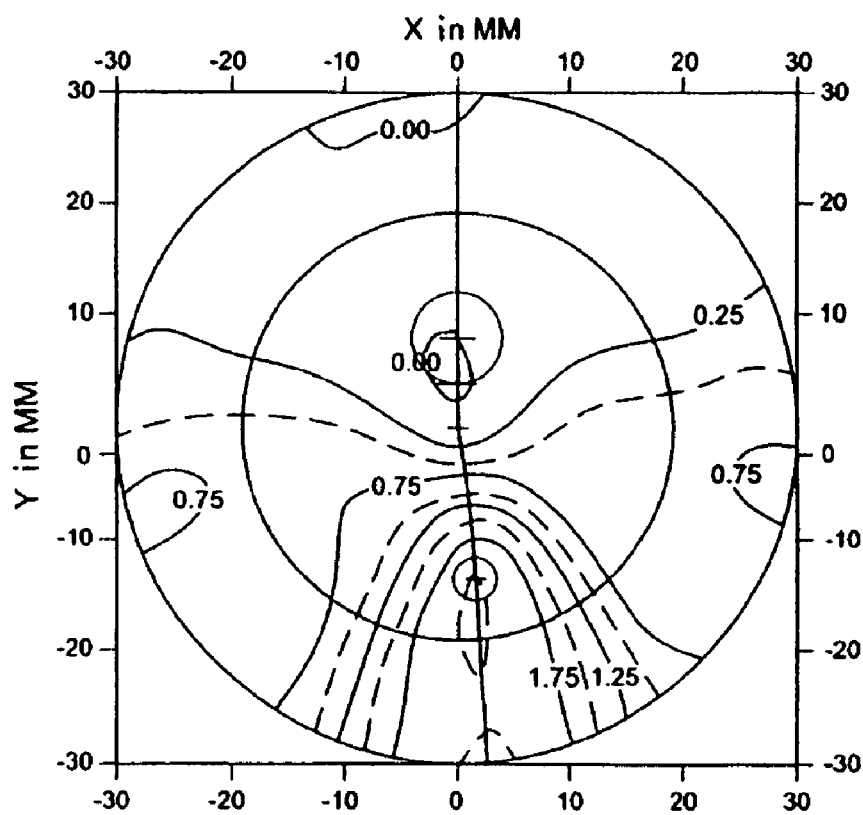
Figure 6:
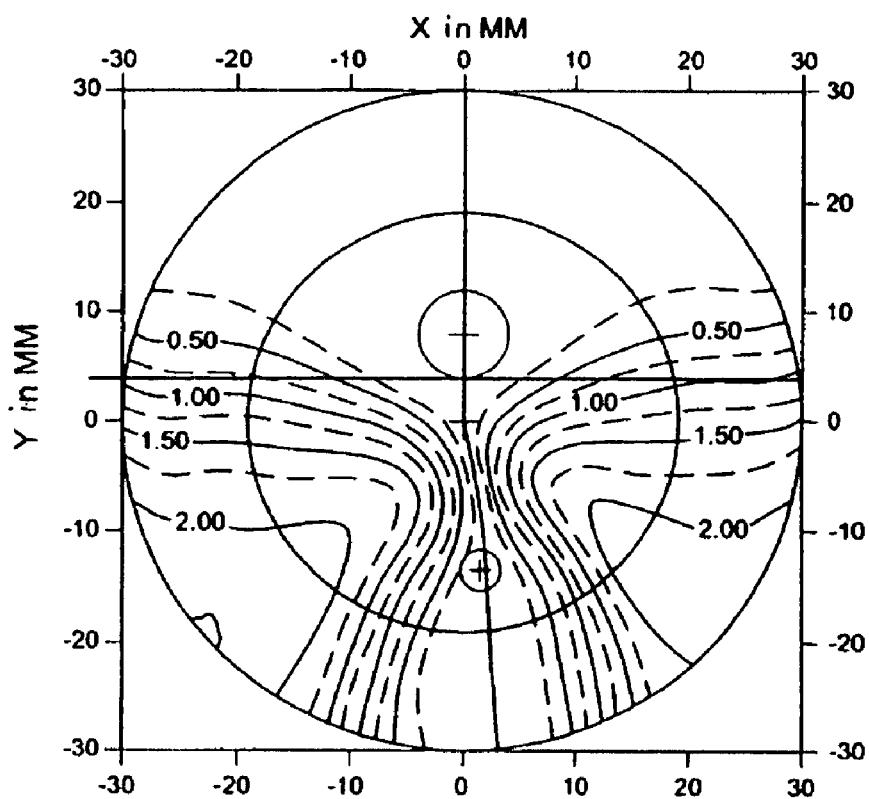
Figure 7:
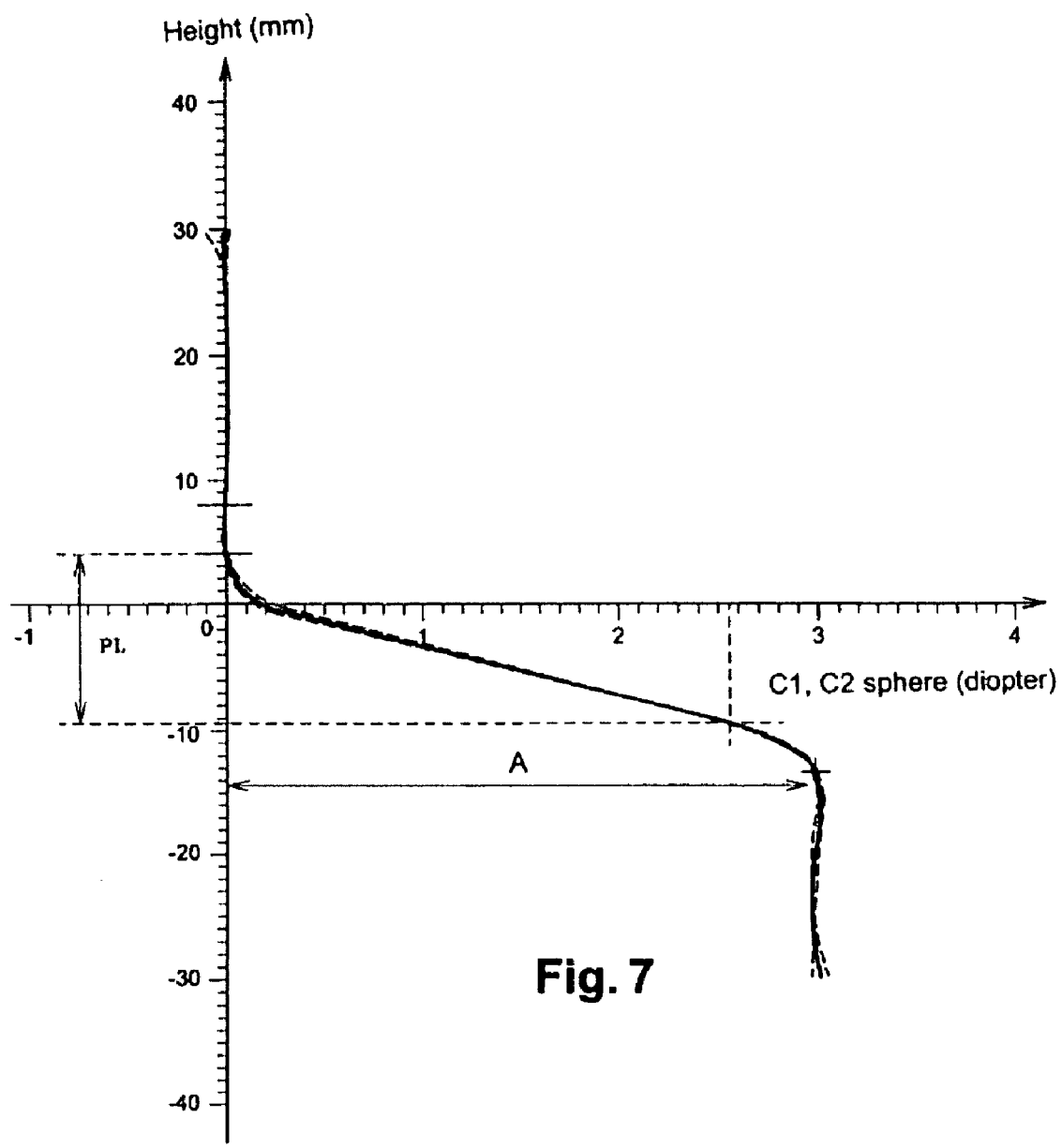
FIGS. 7 to 9, figures similar to FIGS. 1 to 3, for a lens according to a third embodiment of the invention.
Figure 8:
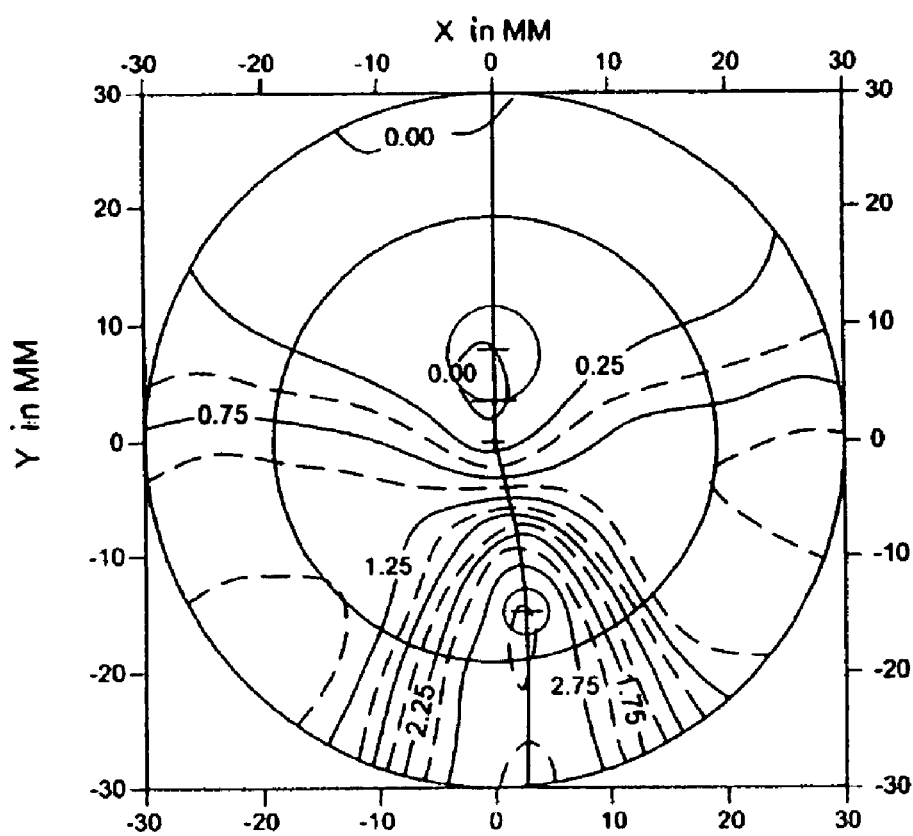
Figure 9:
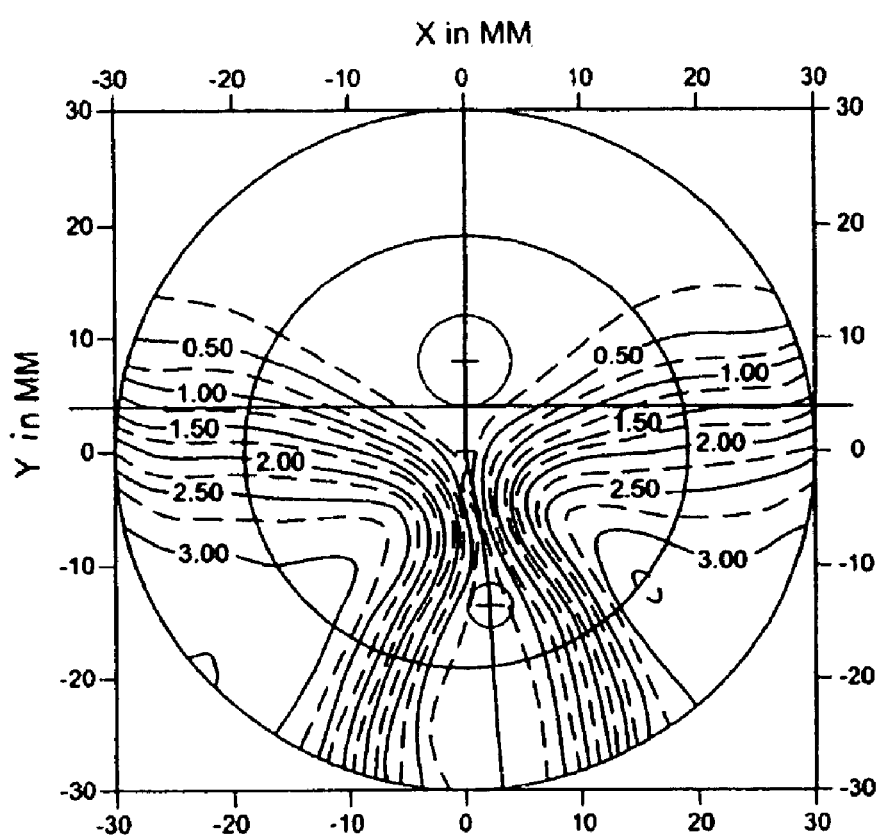

The lens is described in the following with reference to three embodiments. The first embodiment, represented in FIGS. 1 to 3, is suitable for presbyope wearers who have a prescription for a one diopter power progression. The second embodiment, represented in FIGS. 4 to 6, is suitable for presbyope wearers who have a prescription for a power progression equal to two diopters. The third embodiment, represented in FIGS. 7 to 9, is suitable for presbyope wearers who have a prescription for a power progression equal to three diopters.

In the three embodiments described below, the lens has a markedly umbilicated line, called a meridian, on which the astigmatism is practically nil. The meridian coincides with the vertical axis in the upper part of the lens and has an inclination on the nasal side in the lower part of the lens, the convergence being more marked in near vision.

FIG. 1 shows a diagram of the principal curvatures and of the sphere on the meridian of a lens according to a first embodiment of the invention. The points on the complex surface of the lens are plotted on FIG. 1 and on FIGS. 2 and 3 relative to an orthonormalized reference point, originating in the geometric centre (0,0) and the ordinates axis of which is vertical and the abscissa axis is horizontal. In FIG. 1 the curvature or the sphere is plotted on the abscissa axis in diopters; the position on the lens is marked on the ordinates axis in millimetres. FIG. 1 shows, on the ordinate y=8 mm, a reference point in far vision FV and, on the ordinate y=−14 mm, a reference point in near vision NV. The figure also shows, on the ordinate y=4 mm, a reference point called the fitting cross FC of the lens; this is a centring point produced on the lens which is used by the optician to fit the lens in the frame. The fitting cross can be marked by a point produced on the lens, before fitting in the frame, by a cross or any other mark such as a point surrounded by a circle plotted on the lens, or by any other appropriate means.

FIG. 1 shows the sphere as a solid line and, in broken lines, the principal curvatures $(n-1)/R_1$ and $(n-1)/R_2$ on the meridian. The values are reset to zero at the origin, where the mean sphere is actually equal to 3.45 diopters. It is firstly noted that the solid line and the broken lines coincide—which is characteristic of a cylinder which is nil on the meridian of the lens.

It is then possible to note that the mean sphere on the meridian is more or less constant over the upper half of the lens. More precisely, in the example of FIG. 1, the sphere difference over the meridian, between the geometric centre of the lens (0, 0) and the control point in far vision FV, is less than or equal to 0.1 diopters. The mean-sphere variation on the meridian in the upper part of the lens above the fitting cross is more or less nil. This characteristic ensures that the lens, in its upper part and on the meridian, is a unifocal lens. In other words, the power progression takes place below the fitting cross FC of the lens.

The intermediate-vision zone generally begins, for a progressive multifocal lens, at the fitting cross FC, i.e. 4 mm above the optical centre of the lens. It is here that the power progression begins. Thus the mean sphere increases, from the fitting cross FC to the control point in near vision NV, for values of the ordinate y between 4 mm and −14 mm. For ordinates below y=−14 mm, the mean sphere is more or less constant, with a value of the order of 1 diopter equal to the power addition A. The mean-sphere variation on the meridian below the near vision NV control point of the lens is then more or less nil.

It is thus possible to define on the lens a power addition A; this corresponds either to the difference in power between two high and low reference points FV and NV for far and near vision, or to a difference between the more or less constant power value in the lower part of the lens, on the meridian, and the more or less constant power value in the upper part of the lens, on the meridian. More generally, the power addition can be defined as the difference between the maximum and minimum power values on the meridian of the lens; this definition also applies to the mean spheres in the example of a lens characterized by a complex surface. In the example of FIG. 1, this value of the power addition between maximum and minimum values is 1 diopter. It is also possible to define a progression length, called PL in FIG. 1, which is the vertical distance—or the difference in ordinates—between the fitting cross FC and a point on the meridian at which the power progression reaches 85% of the power addition A. In the example of FIG. 1, applying this definition to a lens characterized by a complex surface, a mean sphere of 0.85×1 diopter, i.e. 0.85 diopters, is obtained for an ordinate point y=approximately −9.7 mm. The progression length PL, between the fitting cross FC of ordinate y=4 mm and that point on the meridian at which the mean sphere reaches 85% of the addition, is equal to 13.7 mm. The accessibility to the powers required in near vision is therefore less than 14 mm.

A maximum slope of the sphere variation normalized to the addition is also defined as the maximum of the absolute value of the sphere variation along the meridian divided by the addition. In the example of FIG. 1, applying this definition to a lens characterized by a complex surface, the maximum slope of the sphere normalized to the addition along the meridian is 0.09 $mm^{-1}$.

FIG. 2 shows a mean-sphere map of the lens of FIG. 1; as is customary, the isosphere lines are plotted in FIG. 2 in an orthonormalized reference point; these lines are formed from the points having the same value of the mean sphere. In FIG. 2 the 0 diopter, 0.25 diopter, 0.50 diopter and 0.75 diopter isosphere lines are represented. The 0 diopter isosphere line encircles the fitting cross FC. The mean-sphere value is therefore more or less constant around the fitting cross. The virtually nil sphere variation around the fitting cross allows a certain tolerance of positioning when fitting the lens in the visual device, as will be explained below. The 0.25 diopter isosphere line extends more or less horizontally between the ordinates −3 mm and 5 mm. The 0.50 and 0.75 diopter isosphere lines are marked on the figure and extend into the lower part of the lens, around the meridian.

In FIG. 2, a circle with a diameter of 40 mm centred on the geometric centre (0, 0) of the lens is also represented. In order to give the wearer maximum visual comfort, it is sought to control the sphere variations along this circle; the wearer's peripheral vision is thus improved. Control of the sphere variations along this circle means in this case a limitation of the rebound of the sphere quantity normalized to the addition.

In particular the rebound of the variation of the sphere value along this circle, divided by the value of the addition A, is less than 0.11. The rebound of the sphere quantity normalized to the addition is defined as the difference of the sphere value normalized to the addition between two local extremums situated between the absolute maximum and the absolute minimum.

Figure 10:
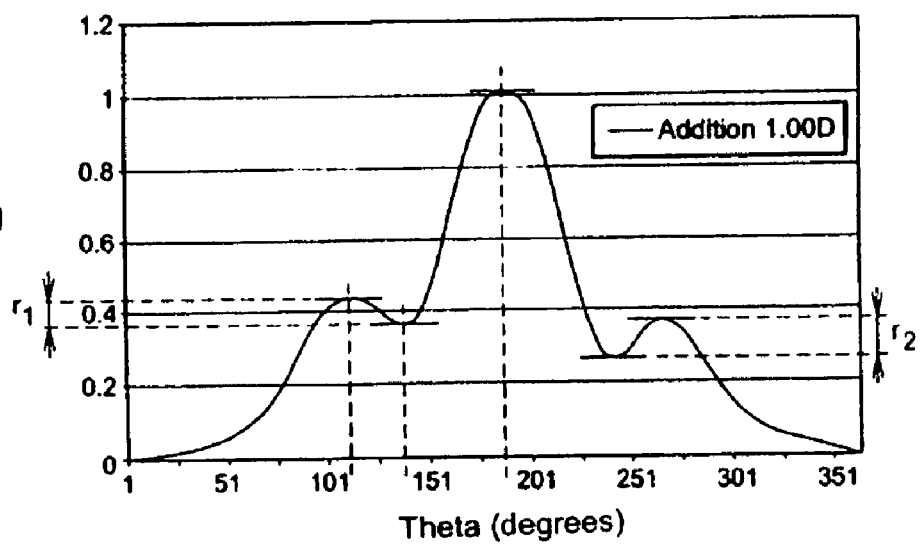
FIGS. 10 to 12, graphical representations of the values of the sphere normalized to the addition on the circle with a diameter of 40 cm centred on the geometric centre of the lens, in relation to the angle, respectively for the lenses of FIGS. 1, 4 and 7.

FIG. 10, which will be discussed in more detail below, represents a graph of the sphere variation normalized to the addition along said circle 40 mm in diameter for the lens of FIG. 1.

FIG. 3 shows a cylinder map of the lens of FIG. 1. The 0.25 diopter, 0.50 diopter, 0.75 diopter and 1 diopter isocylinder lines are represented in the figure. It is noted that the far-vision zone is relatively clear: the isocylinder lines greater than 0.50 diopters are in the lower part of the lens, below the fitting cross FC. It is also noted that the isocylinder lines widen, in the lower part of the lens, at the height of the reference point for near vision NV. FIG. 3 also shows that the isocylinder lines are, for ordinates above the geometric centre (0, 0), more or less parallel and horizontal. This horizontality of the isocylinder lines facilitates peripheral vision and dynamic vision in the far-vision zone. Moreover, FIG. 3 shows a horizontal line passing through the fitting cross at y=4 mm. It is observed that above this line, the cylinder value is less than or equal to half the value of the power addition A, i.e. less than 0.5 diopters in the example of FIG. 3. The lens thus provides a wide far-vision zone, which is very clear in the lateral direction, as well as a good dynamic vision in far vision.

In the lower part of the lens, the lens has a zone suited to near vision; as indicated above, the power (or the mean sphere) on the meridian in the lower part of the lens is more or less constant and corresponds to the power prescribed for the wearer for a distance of the order of 40 cm. The lens therefore provides the necessary correction for near vision.

In the lower part of the lens, the 0.25 and 0.50 diopter isocylinder lines are virtually parallel and vertical and delimit a zone containing the reference point in near vision NV.

FIGS. 4 to 6 are views similar to those of FIGS. 1 to 3, but for a lens having a power addition of 2 diopters on the complex surface.

FIG. 4 shows the characteristics already demonstrated in FIG. 1—except that the mean-sphere progression on the meridian is of the order of 2 diopters and no longer 1 diopter. The mean sphere at the origin is 3.45 diopters. In particular, in the example of FIG. 4, the sphere difference over the meridian, between the geometric centre of the lens (0, 0) and the reference point in far vision FV, is comprised between 0.1 and 0.2 diopters. However, in this example, because the power addition is 2 diopters, the lens of FIG. 4 has a mean-sphere difference normalized to the addition, on the meridian between the geometric centre of the lens and the reference point in far vision FV, less than 0.1 diopters. The mean-sphere variation on the meridian in the upper part of the lens, above the fitting cross is more or less nil, as is the mean-sphere variation on the meridian below the reference point in near vision.

In FIG. 4 the progression length PL is also represented. In the example of FIG. 4, applying the definition given with reference to FIG. 1, a mean sphere of 0.85×2 diopters, i.e. of 1.70 diopters is obtained for an ordinate point y=approximately −9.9 mm. The progression length PL, between the fitting cross FC with the ordinate y=4 mm and that point on the meridian at which the mean sphere reaches 85% of the addition, is equal to 13.9 mm. The accessibility to the powers required in near vision is therefore less than 14 mm. Moreover, in the example of FIG. 4, applying the definition given with reference to FIG. 1, the maximum sphere-variation slope normalized to the addition is equal to 0.10 mm$^{-1}$. It is therefore comprised between 0.09 mm$^{-1}$ and 0.11 mm$^{-1}$.

FIG. 5 shows the 0 to 2 diopter isosphere lines, with a step of 0.25 diopters. As in FIG. 2, a circle with a radius of 20 mm centred on the geometric centre of the lens is represented. The rebound of the variation of the sphere value along this circle, divided by the value of the addition A, is less than 0.11.

Figure 11:
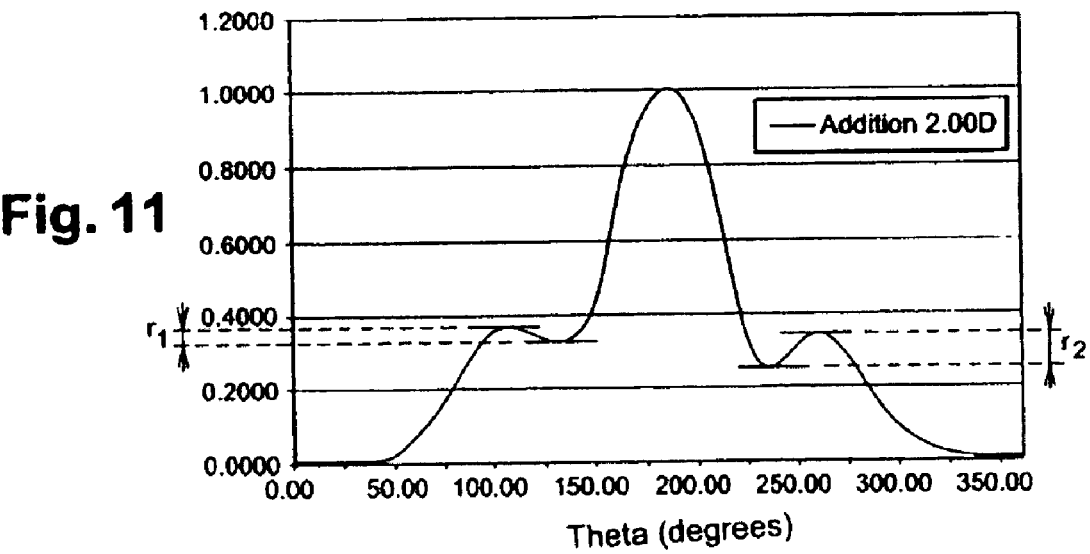

FIG. 11, which will be described below, represents a graph of the sphere variation normalized to the addition along this circle for this lens having a power addition of 2 diopters on the complex surface.

FIG. 6 shows the 0.25 to 2 diopter isocylinder lines, with a step of 0.25 diopters. As in FIG. 3, a horizontal line passing through the fitting cross is represented. It will be seen in FIG. 6, as in FIG. 3, that the cylinder value, above the horizontal line passing through the fitting cross, is less than or equal to 1.00 diopter, i.e. less than or equal to half the value of the power addition. It will also be seen that in the lower part of the lens, the 0.25 and 0.50 diopter isocylinder lines delimit a zone containing the near-vision NV reference point.

FIGS. 7 to 9 are views similar to those of FIGS. 1 to 3, but for a lens having a power addition of 3 diopters on the complex surface.

FIG. 7 shows the characteristics already demonstrated in FIG. 1—except that the mean-sphere progression on the meridian is of the order of 3 diopters and no longer 1 diopter. The mean sphere at the origin is 3.45 diopters. In particular, in the example of FIG. 7, the sphere difference over the meridian, between the geometric centre of the lens (0, 0) and the reference point in far vision FV, is comprised between 0.2 and 0.25 diopters. However, in this example, because the power addition is 3 diopters, the lens of FIG. 7 has a mean-sphere difference normalized to the addition, on the meridian between the geometric centre of the lens and the reference point in far vision FV, of less than 0.1 diopters. The mean-sphere variation on the meridian in the upper part of the lens, above the fitting cross is more or less nil, as is the mean-sphere variation on the meridian below the reference point in near vision.

In FIG. 7 the progression length PL is also represented. In the example of FIG. 7, applying the definition given with reference to FIG. 1, a mean sphere of 0.85×3 diopters, i.e. of 2.55 diopters is obtained for an ordinate point y=approximately −9.9 mm. The progression length PL, between the fitting cross FC with the ordinate y=4 mm and that point on the meridian at which the mean sphere reaches 85% of the addition, is equal to 13.9 mm. The accessibility to the powers required in near vision is therefore less than 14 mm. Moreover, in the example of FIG. 7, applying the definition given with reference to FIG. 1, the maximum sphere-variation slope normalized to the addition is equal to 0.10 mm$^{-1}$. It is therefore comprised between 0.09 mm$^{-1}$ and 0.11 mm$^{-1}$.

FIG. 8 shows the 0 to 3 diopter isosphere lines, with a step of 0.25 diopters. As in FIG. 2, a circle with a radius of 20 mm centred on the geometric centre of the lens is represented. The rebound of the variation of the sphere value along this circle, divided by the value of the addition A, is less than 0.11.

Figure 12:
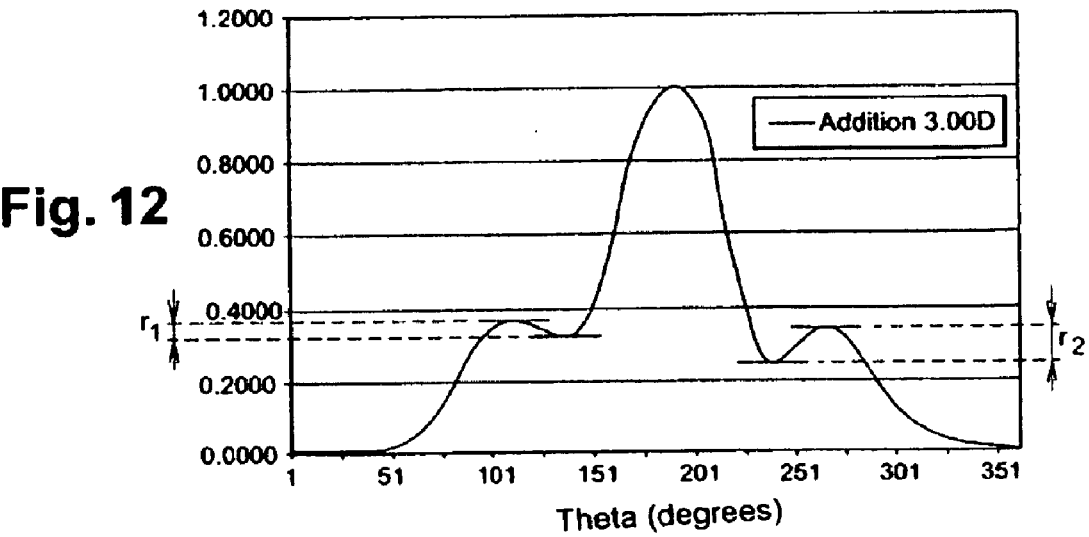

FIG. 12, which will be described below, represents a graph of the sphere variation normalized to the addition along this circle for this lens having a power addition of 3 diopters on the complex surface.

FIG. 9 shows the 0.25 to 3 diopter isocylinder lines, with a step of 0.25 diopters. As in FIG. 3, a horizontal line passing through the fitting cross is represented. It will be seen in FIG. 9, as in FIG. 3, that the cylinder value, above the horizontal line passing through the fitting cross, is less than or equal to 1.50 diopters, i.e. less than or equal to half the value of the power addition. It will also be seen that in the lower part of the lens, the 0.25 and 0.50 diopter isocylinder lines delimit a zone containing the near-vision NV reference point.

FIGS. 1 to 9 illustrate three embodiments of lenses according to the invention. These figures clearly show that the far-vision zone is extended below the fitting cross with a mean-sphere difference normalized to the addition on the meridian, between the geometric centre of the lens and the control point in far vision, less than or equal to 0.1. Moreover, these figures clearly show that the accessibility in the near-vision zone is maintained with a progression length less than or equal to 14 mm between the fitting cross and the point on the meridian at which the mean sphere reaches 85% of the progression of the addition.

FIGS. 10 to 12 show the mean-sphere variation on the circle 40 mm in diameter centred on the geometric centre of the lens, for different addition values. The ordinates are graduated without units because the values are expressed in sphere values (diopters) normalized to the addition (diopters). The abscissae represent the angle θ in a system of polar coordinates the centre of which is the geometric centre of the lens and the angles of which are measured starting from the upward-directed vertical half-line. The graph of FIG. 10 represents the sphere variation on the circle for the I diopter addition lens of FIGS. 1 to 3; the graph of FIG. 11 represents the sphere variation on the circle for the 2 diopter addition lens of FIGS. 4 to 6; the graph of FIG. 12 represents the sphere variation on the circle for the 3 diopter addition lens of FIGS. 7 to 9.

FIGS. 10 to 12 show that the value of the sphere increases upon shifting on the circle from a point of intersection of the circle with the meridian to the other point of intersection of the circle with the meridian to reach an absolute maximum, then the value of the sphere diminishes upon shifting on the circle in order to return to the first point of intersection of the circle with the meridian to define an absolute minimum.

Each graph of the sphere variation normalized to the addition (FIGS. 10 to 12) has two rebounds on either side of the absolute maximum. Each rebound constitutes a break in the monotonic variation of the sphere. However, according to the invention, the evolution of the sphere on the circle with a radius of 20 mm centred on the geometric centre of the lens has two rebounds of low amplitude upon shifting on the circle from a point of intersection of the circle with the meridian to the other point of intersection of the circle with the meridian; this small rebound in the sphere on the circle, on either side of the meridian, provides a gentle and uniform variation of the optical characteristics of the lens and makes it easier for the wearer to adapt to the lens.

FIG. 10 represents the sphere normalized to the addition for a lens having a power addition of 1 diopter, i.e. corresponding to the lens of FIGS. 1 to 3.

The absolute maximum of the sphere normalized to the addition is obtained for abscissa point $\theta=185°$, this point corresponds to the intersection of the circle with the meridian in the lower part of the lens, and has, in the orthonormalized reference point defined above, the coordinates x=2.5 mm, y=−20 mm.

When moving around the circle, from angle point $\theta=0°$ to angle point $\theta=185°$, the variation in the normalized sphere has a first rebound $r_1$ with a value of 0.07 between angle points $\theta=109°$ and $\theta=135°$; when moving round the circle, from angle point $\theta=185°$ to angle point $\theta=360°$, the variation in the normalized sphere has a second rebound $r_2$ with a value of 0.106 between angle points $\theta=238°$ and $\theta=263°$. Thus the rebound of the sphere quantity normalized to the addition is less than 0.11 for the graph of FIG. 10.

FIG. 11 represents the sphere normalized to the addition for a lens having a power addition of 2 diopters, i.e. corresponding to the lens of FIGS. 4 to 6.

The absolute maximum of the sphere normalized to the addition is obtained for abscissa point $\theta=186°$; this point corresponds to the intersection of the circle with the meridian in the lower part of the lens, and has, in the orthonormalized reference point defined above, the coordinates x=2.8 mm, y=−19.5 mm.

When moving round the circle, from angle point $\theta=0°$ to angle point $\theta=186°$; the variation in the normalized sphere has a first rebound $r_1$ with a value of 0.037 between angle points $\theta=109°$ and $\theta=135°$; when moving round the circle, from angle point $\theta=186°$ to angle point $\theta=360°$, the variation in the normalized sphere has a second rebound $r_2$ with a value of 0.083 between angle points $\theta=235°$ and $\theta=260°$. Thus, the rebound of the sphere quantity normalized to the addition is less than 0.11 for the graph of FIG. 11.

FIG. 12 represents the sphere normalized to the addition for a lens having a power addition of 3 diopters, i.e. corresponding to the lens of FIGS. 7 to 9.

The absolute maximum of the sphere normalized to the addition is obtained for abscissa point $\theta=185°$; this point corresponds to the intersection of the circle with the meridian in the lower part of the lens, and has, in the orthonormalized reference point defined above, the coordinates x=2.8 mm, y=−20.5 mm.

When moving round the circle, from angle point $\theta=0°$ to angle point $\theta=185°$, the variation in the normalized sphere has a first rebound $r_1$ with a value of 0.038 between angle points $\theta=109°$ and $\theta=134°$; when moving round the circle, from angle point $\theta=185°$ to angle point $\theta=360°$, the variation in the normalized sphere has a second rebound $r_2$ with a value of 0.083 between angle points $\theta=235°$ and $\theta=261°$. Thus, the rebound of the sphere quantity normalized to the addition is less than 0.11 for the graph of FIG. 10.

The table below shows the characteristic values of the lenses according to the invention for addition values. The table shows, for each value of the addition, the mean-sphere difference normalized to the addition on the meridian between the geometric centre of the lens and the control point in far vision; the progression length; the maximum rebound of the sphere quantity normalized to the addition on the circle with a radius of 20 mm centred on the geometric centre of the lens; and the maximum slope of the sphere variation normalized to the addition along the meridian.

| Addition (diopter) | Normalized sphere difference | Progression length (mm) | Normalized Rebound | Normalized sphere maximum slope (mm$^{-1}$) |
|---|---|---|---|---|
| 1.00 | 0.082 | 13.7 | 0.106 | 0.09 |
| 2.00 | 0.054 | 13.9 | 0.083 | 0.10 |
| 3.00 | 0.054 | 13.9 | 0.083 | 0.10 |

The lens according to the invention is prescribed taking into account the far vision and near vision wearer prescriptions which determines the addition required. The necessary power can be obtained, as in the state of the art, by machining a rear face in order to ensure that the power is identical to the prescribed power.

The fitting of the lens in a visual device can take place in the following manner. The horizontal position of the pupil of the wearer in far vision is measured, or just the interpupillary half-distance, and the overall height of the size of the frame of the visual device is determined. The lens is then fitted in the visual device with the fitting cross positioned in the measured position.

On this point reference can be made to the patent application FR-A-2 807 169 describing a simplified method for fitting ophthalmic lenses in a frame. This document in particular describes the different measures taken by opticians and proposes to measure only the interpupillary half-distance in order to carry out the fitting of the lenses in the frame using the overall height of the size of the frame.

The fitting of the lens therefore requires only a standard measurement of the half interpupillary distance in far vision, as well as a measurement of the height of the size of the frame, in order to determine the height at which the fitting cross must be placed in the frame. The fitting of the lens in the frame takes place simply by measuring the position in the frame of the subject's viewing in far vision; this measurement takes place in a standard manner, with the subject wearing the frame and looking into the distance. The lens is then cut out and is mounted in the frame, so that the fitting cross is in the measured position.

The lens according to the invention allows an improved tolerance for the fitting described above. This tolerance is provided by a sphere value which is more or less constant around the fitting cross. In particular, the normalized value of the mean sphere is more or less nil around the fitting cross. In the figure it can be seen that a 0 diopter isosphere line surrounds the fitting cross.

The lens of the three examples described above can be obtained by optimization of a surface according to the optimization methods known per se and described in the documents of the state of the art mentioned above in relation to progressive multifocal lenses. For the optimization it is possible to use one or more of the criteria described in the above description with reference to FIGS. 1 to 12, and in particular:

a mean-sphere progression of 1 diopter or more;

a mean-sphere difference normalized to the addition on the meridian, between the geometric centre of the lens and the control point in far vision, less than or equal to 0.1;

a progression length less than or equal to 14 mm between the fitting cross and the point on the meridian at which the mean sphere reaches 85% of the progression of the addition;

a rebound in the sphere quantity normalized to the addition on a circle with a radius of 20 mm centred on the geometric centre of the lens less than 0.11;

a maximum slope of the variation of the sphere normalized to the addition along the meridian comprised between 0.09 and 0.11 $mm^{-1}$.

These criteria can be combined with others, in particular with one or more of the criteria proposed in the above examples. One or more of the following criteria can also be used:

a cylinder value less than or equal to half the power addition on the part of the lens situated above a horizontal line passing through the fitting cross;

a more or less constant mean-sphere value around the fitting cross.

The choice of these criteria makes it possible to obtain, by optimization, a lens. A person skilled in the art easily sees that the lens in question does not necessarily have values corresponding exactly to the set criteria; for example, it is not essential for the upper value of the mean-sphere variation to be reached.

In the above optimization examples, it was proposed to optimize only one of the faces of the lenses. It is clear that in all these examples the role of the front and rear surfaces can be easily switched. The sphere progression can also be allocated to one or the other of the two surfaces of the lens, or partially to one face and the other, as soon as optical targets similar to those of the lens described above are reached.

Other embodiments are within the scope of the following claims.

What is claimed is:

1. An ophthalmic lens having a complex surface with an optical centre (0, 0), a fitting cross (FC) situated 4 mm above the optical centre on the vertical axis of the lens, a markedly umbilicated meridian having a power addition (A) between a reference point in far vision (FV) and a reference point in near vision (NV), the complex surface having:

a mean-sphere difference normalized to the addition on the meridian, between the geometric centre of the lens (0, 0) and the control point in far vision (FV), less than or equal to 0.1;

a progression length less than or equal to 14 mm, the progression length being defined as the vertical distance between the fitting cross (FC) and the point on the meridian at which the mean sphere reaches 85% of the progression of the addition;

a rebound in the sphere quantity normalized to the addition (sphere/addition) on a circle with a radius of 20 mm centered on the geometric centre of the lens of less than 0.11;

a maximum slope of the variation of the sphere normalized to the addition along the meridian comprised between 0.09 and 0.11 $mm^{-1}$.

2. The lens of claim 1, characterized in that the mean-sphere difference normalized to the addition on the meridian, between the geometric centre (0, 0) of the lens and the control point in far vision (FV), is less than or equal to 0.06.

3. The lens of claim 1, characterized in that the rebound of the sphere quantity normalized to the addition on the circle with a radius of 20 mm centred on the geometric centre of the lens is less than 0.085.

4. The lens of claim 1, characterized in that the complex surface has, for the part of the lens situated above a horizontal line passing through the fitting cross, a cylinder value less than or equal to half of the power addition (A/2).

5. The lens of claim 1, characterized in that the complex surface has a more or less constant mean-sphere value around the fitting cross.

6. The lens of claim 5, characterized in that the complex surface has a 0 diopter isosphere line encircling the fitting cross.

7. The lens of claim 2, characterized in that the rebound of the sphere quantity normalized to the addition on the circle with a radius of 20 mm centered on the geometric centre of the lens is less than 0.085.

8. A visual device comprising at least a lens having a complex surface with an optical centre (0, 0), a fitting cross (FC) situated 4 mm above the optical centre on the vertical axis of the lens, a markedly umbilicated meridian having a power addition (A) between a reference point in far vision (FV) and a reference point in near vision (NV), the complex surface having:

a mean-sphere difference normalized to the addition on the meridian, between the geometric centre of the lens (0, 0) and the control point in far vision (FV), less than or equal to 0.1;

a progression length less than or equal to 14 mm, the progression length being defined as the vertical distance between the fitting cross (FC) and the point on the meridian at which the mean sphere reaches 85% of the progression of the addition;

a rebound in the sphere quantity normalized to the addition (sphere/addition) on a circle with a radius of 20 mm centered on the geometric centre of the lens of less than 0.11;

a maximum slope of the variation of the sphere normalized to the addition along the meridian comprised between 0.09 and 0.11 $mm^{-1}$.

9. A method for correcting the vision of a presbyope subject, which comprises providing the subject with, or the wearing by the subject of, a device comprising at least a lens having a complex surface with an optical centre (0, 0), a fitting cross (FC) situated 4 mm above the optical centre on the vertical axis of the lens, a markedly umbilicated meridian having a power addition (A) between a reference point in far vision (FV) and a reference point in near vision (NV), the complex surface having:

a mean-sphere difference normalized to the addition on the meridian, between the geometric centre of the lens (0, 0) and the control point in far vision (FV), less than or equal to 0.1;

a progression length less than or equal to 14 mm, the progression length being defined as the vertical distance between the fitting cross (FC) and the point on the meridian at which the mean sphere reaches 85% of the progression of the addition;

a rebound in the sphere quantity normalized to the addition (sphere/addition) on a circle with a radius of 20 mm centered on the geometric centre of the lens of less than 0.11;

a maximum slope of the variation of the sphere normalized to the addition along the meridian comprised between 0.09 and 0.11 $mm^{-1}$.

* * * * *

UNITED STATES PATENT AND TRADEMARK OFFICE
CERTIFICATE OF CORRECTION

PATENT NO. : 7,207,674 B2 Page 1 of 1
APPLICATION NO. : 11/392235
DATED : April 24, 2007
INVENTOR(S) : Bernard Bourdoncle, Cyril Guilloux and Hervé Josso It is certified that error appears in the above-identified patent and that said Letters Patent is hereby corrected as shown below:

On the title page, item [73]:
(73) Assignee, replace "Esslior International (Compagnie General d'Optique)" with --Essilor International (Compagnie Generale d'Optique)--

Signed and Sealed this

Twelfth Day of June, 2007

JON W. DUDAS
*Director of the United States Patent and Trademark Office*